Patented June 15, 1943

2,321,958

UNITED STATES PATENT OFFICE 2,321,958

FORMALDEHYDE ADDITION PRODUCTS AND THEIR PREPARATION

Joseph Frederic Walker, Lewiston, N. Y., assignor to E. I. du Pont de Nemours & Company, Wilmington, Del., a corporation of Delaware No Drawing. Application September 26, 1940, Serial No. 358,521

18 Claims. (Cl. 260—500)

This invention relates to formaldehyde addition products and particularly to their preparation by reactions involving formaldehyde and salts of sulfamic acid.

Reaction products of formaldehyde with sulfamates have been previously prepared although the constitutions of the products obtained have not been clearly established. Empirical analyses for such products reported in chemical literature indicate that they are methylene type addition products. Such earlier preparations, generally involved merely reacting a sulfamate or sulfamic acid with ordinary commercial solutions of formaldehyde. Products obtained by such a method in certain cases are substantially insoluble and relatively unstable and, so far as I am aware, have never been of appreciable importance commercially.

I have discovered that improved reaction products of formaldehyde with sulfamates may be prepared by effecting the reaction in a medium which is slightly alkaline. By observing this precaution, I have found that reaction products of improved stability and increased water solubility are obtained. Accordingly, it is one object of my invention to provide reaction products of formaldehyde with sulfamates which have improved properties as regards stability and solubility and also to provide an improved method for preparing such reaction products.

My improved method is particularly useful for preparing reaction products involving alkaline earth metal sulfamates, particularly calcium and magnesium sulfamates. A particular object of my invention, therefore, is to provide improved reaction products of formaldehyde with alkaline earth metal sulfamates and a method for obtaining such products. Further objects of my invention will be apparent from the ensuing description.

The objects of the invention may be accomplished by reacting formaldehyde with a salt of sulfamic acid in a reaction medium which is alkaline. Preferably, the alkalinity of the reaction medium is adjusted to a pH value of about 8 to 10, although operation within that pH range is not necessary since higher or lower alkalinities may be employed. pH values higher than 11 are not recommended since side reactions due to excess alkalinity become appreciable under such conditions.

The present method of carrying out such reactions is especially useful for preparing reaction products of formaldehyde with alkaline earth metal sulfamates and particularly calcium and magnesium sulfamates. Thus, in the case of calcium sulfamate, the method may be practiced so as to give a reaction product which is extremely soluble in water or in methanol, which product is hygroscopic and is stable in the dry state so long as it is kept in an anhydrous condition.

Throughout the specification and in the appended claims, the term "alkaline earth metal" is used to include magnesium along with metals such as calcium, strontium and barium.

Ordinary commercial aqueous formaldehyde solutions are acidic and generally have a pH of about 3. When calcium sulfamate is reacted with such formaldehyde solutions without adjusting the alkalinity of the reaction mixture, a product is obtained which is substantially insoluble in water and is relatively non-hygroscopic. Such a product will dissolve in water to the extent of about 1%, and the resulting solution is relatively unstable and tends to hydrolyze in a comparatively short time so that the original formaldehyde equivalent of the dissolved material soon disappears and calcium sulfate is precipitated. In contrast, the product obtained by the present method involving the use of an alkaline reaction medium, is extremely soluble in water, is hygroscopic, and its water solutions are much more stable, especially if they are fortified by the addition of an alkaline material, preferably a buffering agent which will maintain the alkalinity of the solution, e. g., within a pH range such as 8 to 10.

Products prepared in accordance with the present method are obviously distinctly different from products prepared in reaction media which are acidic in reaction. However, though it be evident that a difference exists between the two products, it is difficult to establish actual structural differences by means of analytical methods. In reactions involving calcium sulfamate, there are two types of reaction products which might be expected, the structures of which are indicated by the following formulae:

$$Ca(SO_3NH.CH_2OH)_2$$
$$Ca(SO_3N:CH_2)_2$$

In the first formula, the reaction product is represented as a methylol type compound whereas in the other it is represented as a methylene type compound. Both types of compounds might be expected to give formaldehyde reactions, but by analyses using standard methods for formaldehyde, it is impossible to distinguish between a methylene type compound having, for example one molecule of water of crystallization, and a methylol type compound. In view of these analytical difficulties, the structure of compounds prepared in accordance with the present method has not been definitely established although it is believed that they are true methylol compounds. If such be the case, then it is very likely that compounds prepared under acidic conditions are compounds of the methylene type.

The present method of preparing reaction products of formaldehyde with salts of sulfamic acid is illustrated by the following examples.

*Example 1*

A commercial formaldehyde solution containing 37% by weight of formaldehyde was treated with potassium hydroxide so as to have a pH of 8 to 9. An amount of the resulting solution corresponding to 0.6 mol of formaldehyde was reacted with 0.3 mol of calcium sulfamate, $Ca(SO_3NH_2)_2.4H_2O$. The temperature of the reaction mixture was kept below 35° C. during the course of one hour. The reaction was probably complete in ten to fifteen minutes, but a longer time was employed to assure completion of the reaction. The resulting solution was found by analysis, employing a modification of the usual sodium sulfite method for determining formaldehyde, to contain an amount of combined formaldehyde equivalent to the theoretical value for calcium methylol sulfamate, $Ca(SO_3NH.CH_2OH)_2$. In contrast with ordinary formaldehyde solutions, the aqueous solution of the reaction product obtained contained no formaldehyde odor, showing that the solution was free from uncombined formaldehyde.

In analyzing the present reaction products for combined formaldehyde by the sodium sulfite method, it is necessary to allow a reaction period of two hours in order for the reaction between sodium sulfite and the sulfamate-formaldehyde product to come to completion. Such an extended reaction period is not necessary when analyzing for free formaldehyde.

Upon adding to the reaction mixture an equal volume of methanol followed by two volumes of acetone, there separated from the reaction mixture of Example 1 a viscous liquid which did not crystallize unless sufficient acid was added thereto to give a pH of about 2.5. The product which precipitated at that pH soon heated up spontaneously and decomposed with evolution of formaldehyde. By evaporating the reaction mixture under reduced pressure, instead of adding methanol and acetone, there was obtained an odorless, crystalline product which was extremely soluble in water. This method of preparing the crystalline product generally results in a product which, upon analysis by the sodium sulfite method, gives a value of 17.8%, calculated as formaldehyde, as against a theoretical value of 20.5% for calcium methylol sulfamate.

The alkaline aqueous solution of the product obtained as described in Example 1 is generally stable for periods as long as one day. The period of stability, however, may be increased to a matter of weeks or months by fortifying the solution with an alkaline material, preferably a buffer agent which is effective in maintaining a pH of, for example, 8 to 10. Such buffering agents may be any of the well-known materials of that sort such as hexamethylenetetramine, ethanolamine, sodium formate, urea and the like. Some of these agents appear to have a stabilizing in addition to a buffering effect.

The solid product obtained by the method of the above example is hygroscopic and very soluble in water, one gram of water dissolving about two grams of the product. It is very soluble in methanol, slightly soluble in ethanol, and is stable upon storage so long as it is maintained in an anhydrous condition.

*Example 2*

A mixture of 0.3 mol of calcium sulfamate and paraformaldehyde equivalent to 0.6 mol of formaldehyde was added to 108 grams of methanol, the alkalinity of the methanol solution being adjusted to a pH of 8 to 9. The temperature of the reaction mixture was kept below 35° C. for about one hour. The resulting reaction mixture was stable at room temperature for one to two weeks and for longer periods when 1% of hexamethylene tetramine was added thereto.

By vacuum drying the reaction mixture, a product was obtained which, on analysis, showed a purity of about 90%, calculated as calcium methylol sulfamate. The crystalline product was highly hygroscopic and very soluble in water and methanol, being substantially the same in these respects as the product obtained in Example 1.

In the foregoing examples, the calcium sulfamate crystals employed were the tetrahydrate. The dihydrate, obtained by dehydrating the tetrahydrate in vacuo over calcium chloride, may also be used and indications are that the most stable solutions in methanol are obtained when sulfamate which has been dehydrated as much as possible is used in carrying out preparations in methanol.

*Example 3*

A charge of 14.4 grams of magnesium sulfamate tetrahydrate, 3.2 grams of paraformaldehyde and 50 cc. of methanol was made alkaline with 0.5 cc. of N/10 potassium hydroxide and agitated at room temperature for five hours. On filtration a viscous solution of the reaction product was obtained which on vacuum evaporation gave a colorless, hygroscopic crystalline solid highly soluble in water. In general the solubility properties of the product are the same as those for the product of Example 1. Both product and product solution were completely odorless. The presence of combined formaldehyde was demonstrated by treatment of the product with neutral sodium sulfite, free alkali being gradually liberated as the reaction proceeded. An alcoholic solution of the reaction product had a pH of 8.5 and showed no apparent decomposition after fifteen days' storage at room temperature.

The reaction product of formaldehyde with magnesium sulfamate may also be prepared in an aqueous reaction medium by the method described in Example 1 with reference to the reaction involving calcium sulfamate.

*Example 4*

The pH of 16.1 grams of 37% formaldehyde solution was adjusted to 8.5 by the addition of alkali and 26.5 grams of stronium sulfamate gradually added with constant stirring. On filtering this solution to remove a trace of precipitate, a clear viscous liquid possessing only a very slight odor of formaldehyde was obtained. A portion of the reaction mixture was treated with acetone which precipitated an odorless, highly soluble, hygroscopic crystalline solid containing combined formaldehyde.

*Example 5*

To a solution of 7.5 grams of 37% formaldehyde solution and 15 cc. of water were added 15 grams of barium sulfamate and 0.12 cc. of 0.6 N potassium hydroxide. The pH of the resultant solution was 8.1. The barium sulfamate dissolved to give a clear solution with no odor of formaldehyde, ten minutes after the addition of the alkali which was instrumental in causing solution to take place. The reaction mixture was kept at 15° C. by means of a cooling bath. Evaporation of the reaction mixture in a vacuum dessicator over calcium chloride gave crystalline, odorless hygroscopic solid which was very soluble in water. Analysis of the solid by the sodium sulfite procedure indicated that it contained 14.5% of combined formaldehyde which is 96% of the theoretical value for barium methylol sulfamate, $Ba(SO_3NHCH_2OH)_2$.

In practicing the present method, an excess of formaldehyde or the sulfamate may be used. However, under most conditions good results are obtained employing the reactants in stoichiometrical proportions, i. e. in the proportion of one mol of formaldehyde to each sulfamate group present in the sulfamic acid salt being reacted. Somewhat more than theoretical amount of the sulfamate may be desirable in some cases, since a slight excess, e. g., of 1–2% up to 10%, of calcium sulfamate apparently increases the stability of the product, particularly in solution.

The formaldehyde reaction products with alkaline earth metal sulfamates prepared in accordance with the present method are hygroscopic, and are stable in the solid state at ordinary temperatures under anhydrous conditions. They are soluble in water at ordinary temperatures to the extent of at least about one part by weight per one part of water. In most cases the solubility is even greater. Thus, as much as two parts of the calcium sulfamate reaction product will dissolve in one part by weight of water. The calcium and magnesium sulfamate reaction products are also very soluble in methanol, are somewhat soluble in ethanol, but substantially insoluble in propanol.

The present products, either in the crystalline form or in the form of methanol or aqueous solutions, have no odor of formaldehyde and may be used in many commercial applications in place of formaldehyde or paraformaldehyde. Their action as substitutes for formaldehyde may, at times, be due to the liberation of free formaldehyde under the conditions of use, although there are indications that, in some cases at least, the present products react as such with other substances without first liberating free formaldehyde. Not only are the crystalline products useful, but their solutions are also of considerable value. Under some circumstances, solutions of, for example, the calcium sulfamate reaction product, are preferable to the crystalline product. When such is the case, the aqueous or methanol solution obtained during the reaction of formaldehyde with the sulfamate may be used directly instead of first separating the crystalline product and then dissolving the same in water or methanol.

While the present method is of special value for preparing reaction products of calcium and magnesium sulfamates, it may be used with good success in preparing reaction products of other alkaline earth metal sulfamates and also other salts of sulfamic acid. The alkali metal sulfamates may be reacted with formaldehyde by the present method, although the resulting products are relatively unstable. However, solutions thereof may be of some value and may be prepared by the present method.

Adjustment of the alkalinity of the reaction mixture may be made employing the usual alkaline agents such as the alkali and alkaline earth metal hydroxides, oxides, carbonates and the like, or by using organic bases or various salts which have an alkaline reaction. Similarly, the stability of the product, particularly in solution, may be improved by addition of various alkaline materials, preferably substances which tend to buffer the alkalinity at a pH of about 8 to 10.

Aqueous solutions of the present products tend to decompose at temperatures above about 65° C. Accordingly, in preparing the products, temperatures above 65° C. are best avoided. Preferably, the temperature of the reaction mixture is not permitted to exceed 40° C. and temperatures of the order of 15 to 30° C. are generally satisfactory.

Ordinary aqueous formaldehyde solutions or paraformaldehyde may be used as the source of formaldehyde in practicing the present invention, as may also other forms of formaldehyde such as the polyoxymethylenes or any formaldehyde polymer which yields formaldehyde in alkaline media. With aqueous reaction media, either aqueous formaldehyde solutions or paraformaldehyde give good results, while in methanol media, the use of paraformaldehyde as the source of formaldehyde is preferred.

As many widely different modifications of the present invention may be practiced without departing from the spirit and scope thereof, it is to be understood that the invention is not to be limited by the foregoing description and examples, which are intended merely to be illustrative, except as indicated in the appended claims.

I claim:

1. The method comprising reacting formaldehyde with a salt of sulfamic acid in an alkaline reaction medium at a temperature below that at which excessive decomposition of the primary reaction product of said reactants occurs.

2. The method comprising reacting formaldehyde with a sulfamate of an alkaline earth metal in an alkaline reaction medium at a temperature below that at which excessive decomposition of the primary reaction product of said reactants occurs.

3. The method comprising reacting formaldehyde with calcium sulfamate in an alkaline reaction medium at a temperature below that at which excessive decomposition of the primary reaction products of said reactants occurs.

4. The method comprising reacting formaldehyde with magnesium sulfamate in an alkaline reaction medium at a temperature below that at which excessive decomposition of the primary reaction product of said reactants occurs.

5. The method comprising reacting formaldehyde with an alkaline earth metal sulfamate in an alkaline reaction medium at a pH not greater than 11 and at a temperature not higher than 65° C.

6. The method comprising reacting formaldehyde with an alkaline earth metal sulfamate in an aqueous medium at a pH of 8 to 10 and separating the reaction product from the reaction mixture.

7. The method comprising reacting formaldehyde with calcium sulfamate in an aqueous medium at a pH of 8 to 10 and separating the reaction product from the reaction mixture.

8. The method comprising reacting formaldehyde with calcium sulfamate in an alkaline methanol medium at a pH not greater than 11 and at a temperature not higher than 65° C.

9. The method comprising reacting formaldehyde with calcium sulfamate in methanol at a pH of 8 to 10 and separating the reaction product from the reaction mixture.

10. A reaction product of formaldehyde with an alkaline earth metal sulfamate, said product being highly soluble in water and having been prepared under alkaline conditions.

11. A reaction product of formaldehyde with calcium sulfamate, said product being highly soluble in water and having been prepared under alkaline conditions.

12. A reaction product of formaldehyde with magnesium sulfamate, said product being highly soluble in water and having been prepared under alkaline conditions.

13. A composition comprising an alkaline solution of a reaction product of a salt of sulfamic acid with formaldehyde, said reaction product having been prepared under alkaline conditions.

14. A composition comprising an alkaline aqueous solution of a reaction product of an alkaline earth metal sulfamate with formaldehyde, said reaction product having been prepared under alkaline conditions.

15. A composition comprising an alkaline aqueous solution of a reaction product of calcium sulfamate with formaldehyde, said reaction product having been prepared under alkaline conditions.

16. A composition comprising an alkaline solution in methanol of a reaction product of calcium sulfamate with formaldehyde, said reaction product having been prepared under alkaline conditions.

17. A composition of matter comprising a reaction product of formaldehyde with an alkaline earth metal sulfamate and an agent having a buffering action in the pH range 8 to 10, said reaction product being highly soluble in water and having been prepared under alkaline conditions.

18. A composition of matter comprising a reaction product of formaldehyde with calcium sulfamate and an agent having a buffering action in the pH range 8 to 10, said reaction product being highly soluble in water and having been prepared under alkaline conditions.

JOSEPH FREDERIC WALKER.

CERTIFICATE OF CORRECTION.

Patent No. 2,321,958.                                                    June 15, 1943.

JOSEPH FREDERIC WALKER.

It is hereby certified that error appears in the printed specification of the above numbered patent requiring correction as follows: Page 2, second column, line 67, for "stronium" read --strontium--; and that the said Letters Patent should be read with this correction therein that the same may conform to the record of the case in the Patent Office.

Signed and sealed this 20th day of July, A. D. 1943.

(Seal)                                        Henry Van Arsdale,
Acting Commissioner of Patents.